(12) United States Patent
O'Gwynn et al.

(10) Patent No.: US 11,895,675 B2
(45) Date of Patent: *Feb. 6, 2024

(54) SYSTEMS AND METHODS FOR AUTOMATICALLY ASSIGNING VOICE COMMUNICATION CHANNELS TO EMPLOYEES IN QUICK SERVICE RESTAURANTS

(71) Applicant: H.M. Electronics, Inc., Carlsbad, CA (US)

(72) Inventors: David O'Gwynn, Oceanside, CA (US); Rick Evan Schwartz, Carlsbad, CA (US)

(73) Assignee: H.M. Electronics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,213

(22) Filed: Mar. 6, 2023

(65) Prior Publication Data

US 2023/0209574 A1 Jun. 29, 2023

Related U.S. Application Data

(63) Continuation of application No. 17/869,639, filed on Jul. 20, 2022, now Pat. No. 11,665,713, which is a (Continued)

(51) Int. Cl.
*H04H 20/71* (2008.01)
*H04W 72/30* (2023.01)
(Continued)

(52) U.S. Cl.
CPC .......... *H04W 72/30* (2023.01); *G06F 9/4451* (2013.01); *G06Q 10/105* (2013.01);
(Continued)

(58) Field of Classification Search
CPC ....... H04W 72/30; H04W 4/08; H04W 72/51; H04W 4/10; H04W 72/0453;
(Continued)

(56) References Cited

U.S. PATENT DOCUMENTS 5,117,501 A 5/1992 Childress
7,082,314 B2 7/2006 Farmer
(Continued)

FOREIGN PATENT DOCUMENTS

CA 3083577 6/2019
EP 1207452 5/2002

*Primary Examiner* — Chuong T Ho
(74) *Attorney, Agent, or Firm* — Esplin & Associates, PC

(57) ABSTRACT

Systems and methods for assigning voice communication channels used by a crew of employees using communication devices are disclosed. Exemplary implementations may: electronically store information, wherein the information represents associations of individual voice communication channels with one or more communication groups; receive user input that identifies employees, automatically determine sets of communication channel assignments per communication device, between communication channels and subsets of communication groups; configure communication devices according to the determined assignments; and facilitate packet-based communication, using the communication channels, between the communication devices.

22 Claims, 6 Drawing Sheets

Related U.S. Application Data continuation of application No. 16/947,711, filed on Aug. 13, 2020, now Pat. No. 11,452,073.

(51) Int. Cl.
    *G06F 9/445*     (2018.01)
    *G06Q 10/105*     (2023.01)
    *H04L 12/18*     (2006.01)
    *H04W 4/08*     (2009.01)
    *H04W 72/51*     (2023.01)

(52) U.S. Cl.
    CPC ............ *H04L 12/185* (2013.01); *H04W 4/08* (2013.01); *H04W 72/51* (2023.01)

(58) Field of Classification Search
    CPC . H04W 72/121; G06F 9/4451; G06Q 10/105; H04L 12/185
    USPC ........................................................ 370/312
    See application file for complete search history.

(56) References Cited

U.S. PATENT DOCUMENTS

| | | | |
|---|---|---|---|
| 7,920,539 B2 | 4/2011 | Stanford | |
| 8,447,324 B2 | 5/2013 | Shuman | |
| 8,553,865 B2 | 10/2013 | Menard | |
| 9,408,022 B1 | 8/2016 | O'Gwynn | |
| 9,641,926 B2 | 5/2017 | Awiszus | |
| 9,641,933 B2 | 5/2017 | Appelbaum | |
| 10,869,179 B1 | 12/2020 | Ma | |
| 10,993,088 B1 * | 4/2021 | O'Gwynn | ............... H04W 4/10 |
| 11,310,634 B2 | 4/2022 | O'Gwynn | |
| 11,452,073 B2 * | 9/2022 | O'Gwynn | ............. H04L 12/185 |
| 11,665,713 B2 * | 5/2023 | O'Gwynn | ............. H04L 12/185 370/312 |
| 2003/0100274 A1 | 5/2003 | Brown | |
| 2003/0134666 A1 | 7/2003 | Fletcher | |
| 2003/0162504 A1 | 8/2003 | Sabongi | |
| 2004/0116071 A1 | 6/2004 | Hall | |
| 2006/0045063 A1 | 3/2006 | Stanford | |
| 2006/0093117 A1 | 5/2006 | Agrawal | |
| 2008/0318592 A1 | 12/2008 | Mandalia | |
| 2009/0080396 A1 | 3/2009 | Song | |
| 2009/0291646 A1 | 11/2009 | Ong | |
| 2010/0190518 A1 | 7/2010 | Lindner | |
| 2010/0271983 A1 | 10/2010 | Bryant | |
| 2012/0140747 A1 | 6/2012 | Taniguchi | |
| 2014/0153485 A1 | 6/2014 | Tsuda | |
| 2016/0127264 A1 | 5/2016 | Williamson | |
| 2016/0189249 A1 | 6/2016 | Meyer | |
| 2017/0324807 A1 | 11/2017 | Gu | |
| 2018/0317165 A1 | 11/2018 | Krishnamoorthy | |
| 2019/0104377 A1 | 4/2019 | Nilsson | |
| 2020/0106630 A1 | 4/2020 | Bourassa | |
| 2021/0243150 A1 | 8/2021 | Vasamsetti | |
| 2021/0392471 A1 | 12/2021 | OGwynn | |
| 2022/0053453 A1 | 2/2022 | O'Gwynn | |
| 2022/0094795 A1 | 3/2022 | O'Gwynn | |
| 2022/0240057 A1 | 7/2022 | O'Gwynn | |
| 2022/0303392 A1 | 9/2022 | O'Gwynn | |
| 2022/0361145 A1 | 11/2022 | O'Gwynn | |

\* cited by examiner

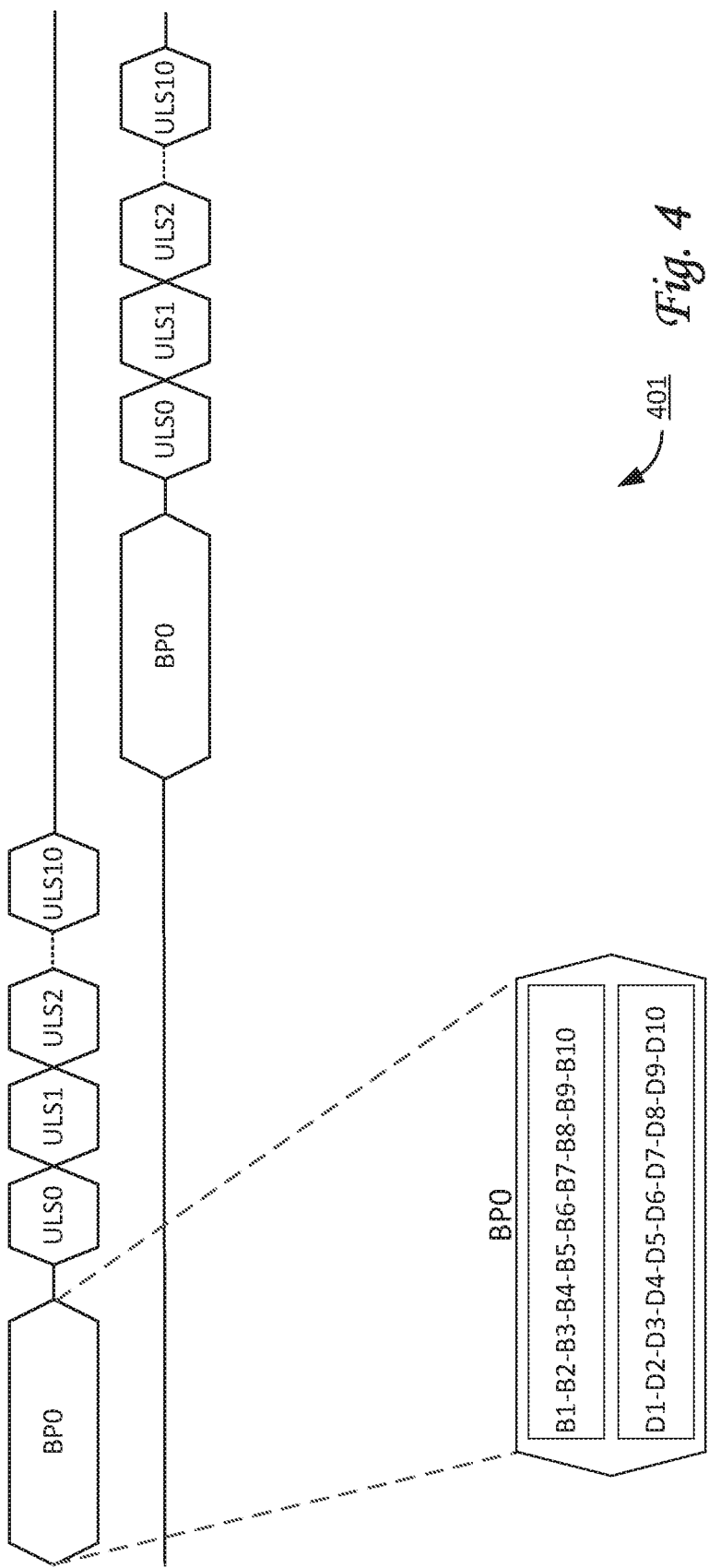

*Fig. 5A*

| Channel Select: | Communication Group I | Communication Group II | Communication Group III |
|---|---|---|---|
| "A" | C1 | C2 | C7 |
| "B" | C3 | C3 | C4 |
| "C" | C4 | C5 | C5 |
| "D" | C6 | C6 | C6 |

*Fig. 5B*

| Channel Select: | Communication Group I | Communication Group II | Communication Group III | Communication Group IV |
|---|---|---|---|---|
| "A" | C1 | C2 | C7 | C9 |
| "B" | C3 | C3 | C4 | C8 |
| "C" | C4 | C5 | C5 | -- |
| "D" | C6 | C6 | C6 | -- |
| "E" | -- | -- | C8 | |

*Fig. 5C*

| Channel Select: | Communication Group I | Communication Group II | Communication Group III | Communication Group IV |
|---|---|---|---|---|
| "A" | C1 | C2 | C3 | C4 |
| "B" | C5 | C5 | C6 | C7 |
| "C" | C8 | C6 | C7 | C8 |

*Fig. 5D*

| Channel Select: | Communication Group I | Communication Group II | Communication Group III | Communication Group IV | Communication Group V |
|---|---|---|---|---|---|
| "A" | C1 | C2 | C3 | C4 | C5 |
| "B" | C6 | C6 | C7 | C8 | C9 |
| "C" | C7 | C10 | C10 | C11 | C12 |
| "D" | C8 | -- | C11 | C12 | -- |
| "E" | C9 | -- | -- | -- | -- |

SYSTEMS AND METHODS FOR AUTOMATICALLY ASSIGNING VOICE COMMUNICATION CHANNELS TO EMPLOYEES IN QUICK SERVICE RESTAURANTS

FIELD OF THE DISCLOSURE

The present disclosure relates to systems and methods for automatically assigning voice communication channels for groups of people interacting and/or otherwise working together using communication devices, such as a crew of employees in a quick-service restaurant.

BACKGROUND

Communication systems using a central communication device and an end-user communication device are known. Intercom communication is known.

SUMMARY

One aspect of the present disclosure relates to a communication system configured for assigning and/or using voice communication channels, e.g., as used by a crew of employees, e.g., in a quick-service restaurant having one or more drive-through lanes. As used herein, the term "employee" and derivatives thereof generically refer to people interacting and/or otherwise working together, regardless of official and/or technical employment status or corporate hierarchy. The terms employee and crew member may be used interchangeably, and may include people who own any part of a corporation. The drive-throughs may include one or both of a menu board and a speaker post. The communication system may include electronic storage and one or more hardware processors. The electronic storage may electronically store information. The information represents associations of individual voice communication channels with one or more communication groups. Individual ones of the one or more communication groups may be specific to one or more (types of) roles of employees, e.g., in the quick-service restaurant. Individual associations may be between an individual voice communication channel and a subset of the one or more communication groups. The one or more communication groups may include a first communication group, a second communication group, a third communication group, and so forth. The first communication group may be specific to (a first type of) roles in the quick-service restaurant that are related to the first drive-through lane. The second communication group may be specific to (a second type of) roles in the quick-service restaurant, and in some cases may be related to a second drive-through lane. The third communication group may be specific to (a third type of) roles in the quick-service restaurant that may be related to food production. The one or more hardware processors may be configured by machine-readable instructions to receive user input from a first employee. The one or more hardware processors may be configured by machine-readable instructions to automatically determine a first set of communication channel assignments for a first communication device. The one or more hardware processors may be configured by machine-readable instructions to configure the first communication device according to the determined first set of communication channel assignments. The one or more hardware processors may be configured by machine-readable instructions to receive device-specific packets from communication devices associated with crew members. The device-specific packets may include packetized uplink information based on audio information captured by the communication devices. The device-specific packets may be targeted to one or more of the communication groups. The one or more hardware processors may be configured by machine-readable instructions to generate downlink packets that includes packetized downlink information that is organized in a set of broadcast channels. Individual broadcast channels may be used for audio information received in device-specific packets that were targeted to individual subsets of the one or more communication groups. The one or more hardware processors may be configured by machine-readable instructions to transmit downlink packets to a set of communication devices. The first communication device may be configured to present audio information received in any of the individual broadcast channels that are associated with any of the individual subsets of the one or more communication groups that include the given communication channel as selected.

Another aspect of the present disclosure relates to a method for assigning and/or using voice communication channels, e.g., as used by a crew of employees, e.g., in a quick-service restaurant having one or more drive-through lanes. The method may include electronically storing information. The information represents associations of individual voice communication channels with one or more communication groups. Individual ones of the one or more communication groups may be specific to one or more (types of) roles of employees in the quick-service restaurant. Individual associations may be between an individual voice communication channel and a subset of the one or more communication groups. The one or more communication groups may include a first communication group, a second communication group, a third communication group, and so forth. The first communication group may be specific to (a first type of) roles in the quick-service restaurant that are related to the first drive-through lane. The second communication group may be specific to (a second type of) roles in the quick-service restaurant, and in some cases may be related to a second drive-through lane. The third communication group may be specific to (a third type of) roles in the quick-service restaurant that may be related to food production. The method may include receiving user input from a first employee. The method may include automatically determining a first set of communication channel assignments for a first communication device. The method may include configuring the first communication device according to the determined first set of communication channel assignments. The method may include receiving device-specific packets from communication devices associated with crew members. The device-specific packets may include packetized uplink information based on audio information captured by the communication devices. The device-specific packets may be targeted to one or more of the communication groups. The method may include generating downlink packets that includes packetized downlink information that is organized in a set of broadcast channels. Individual broadcast channels may be used for audio information received in device-specific packets that were targeted to individual subsets of the one or more communication groups. The method may include transmitting downlink packets to a set of communication devices. The first communication device may present audio information received in any of the individual broadcast channels that are associated with any of the individual subsets of the one or more communication groups that include the given communication channel as selected.

As used herein, any association (or relation, or reflection, or indication, or correspondency) involving communication systems, information processing units, processors, communication devices, communication protocols, sub-systems, base stations, microphones, headsets, analog-to-digital converters, digital-to-analog converters, transceivers, encoders, decoders, channels, communication groups, assignments, determinations, time periods, timeframes, packets, information signals, sounds, wires, formats, standards, connections, instructions, configurations, messages, user interfaces, users, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates an exemplary timeframe as may be used by a system configured for assigning voice communication channels used by a group of people, in accordance with one or more implementations.

FIGS. 5A-5B-5C-5D illustrate exemplary sets of assignments of voice communication channels, in accordance with one or more implementations.

DETAILED DESCRIPTION

Figure 1:
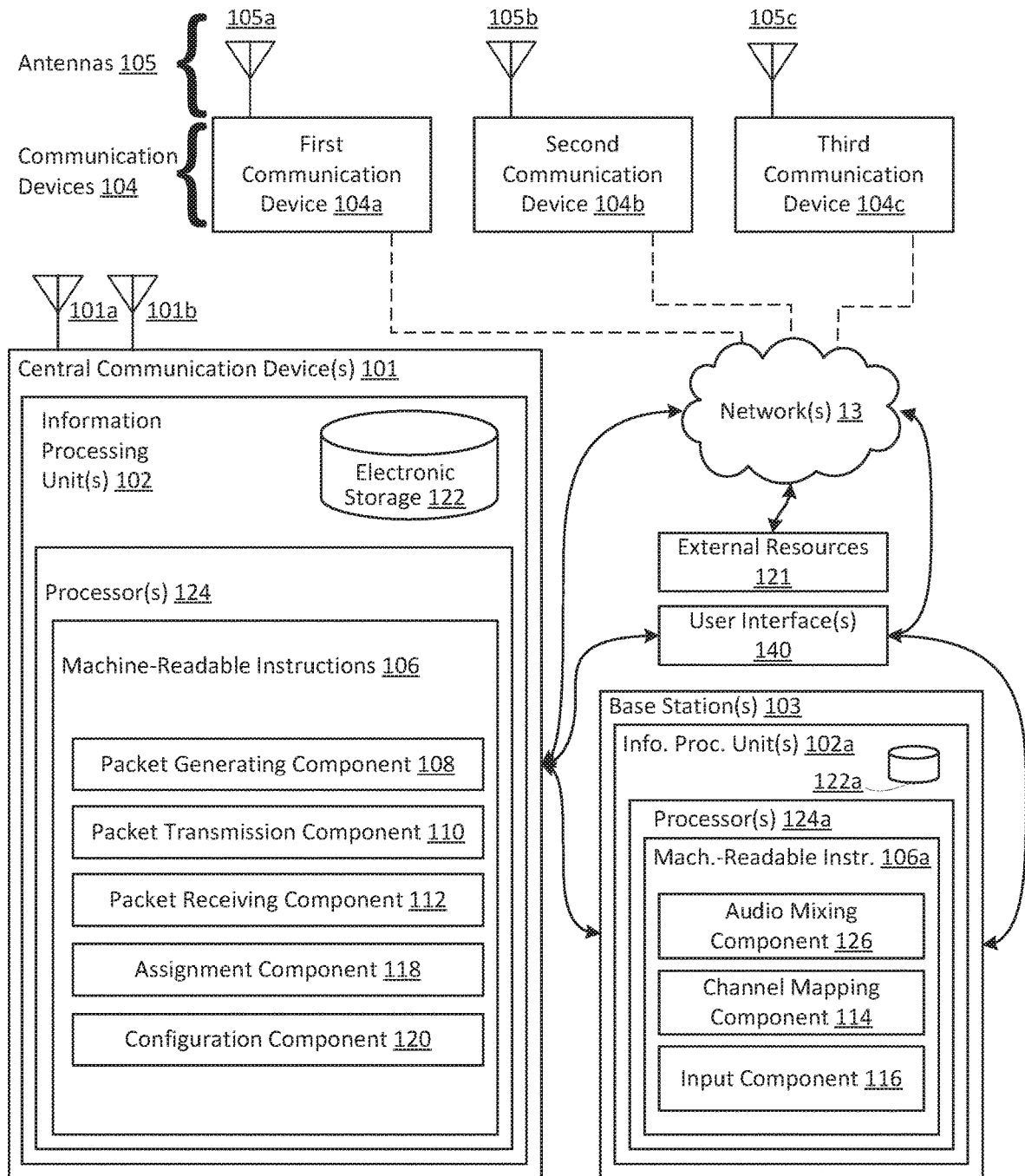
FIG. 1 illustrates a communication system configured for assigning and using voice communication channels used by a crew of employees, in accordance with one or more implementations.

FIG. 1 illustrates a system 100 configured for assigning and/or using voice communication channels, e.g., as used by a crew of employees, e.g., in a quick-service restaurant having one or more drive-through lanes. System 100 may be referred to as an intercom communication system, or as a communication system. In some implementations, system 100 may include one or more central communication devices 101, one or more information processing units 102, one or more processors 124, electronic storage 122, one or more base stations 103, one or more external resources 121, one or more user interfaces 140, one or more communication devices 104 and/or other components.

The users of system 100 may include employees, staff members or crew members, managers and/or other stakeholders, and/or other groups of people interacting and/or otherwise working together. The users of system 100 may be divided and/or organized into a set of communication groups. In some implementations, individual communication groups may be specific to one or more (types of) roles of employees in a quick-service restaurant. For example, a given communication group may be specific to a given role or type of role of people interacting and/or otherwise working together. In some implementations, individual communication groups may be specific to one or more locations in a work area and/or other localized area. In some implementations, individual communication groups may be specific to one or more responsibilities in a work area and/or other localized area. For example, the communication groups for a quick-service restaurant may include four communication groups: a first communication group may be specific to roles in the quick-service restaurant that are related to a first drive-through lane, a second communication group may be specific to roles in the quick-service restaurant that are related to a second drive-through lane, a third communication group may be specific to roles in the quick-service restaurant that are related to food production, and a fourth communication group may be specific to roles in the quick-service restaurant that are related to the front counter. Variations may use only one drive-through lane, and/or may combine the groups for food production, front counter, outside order-taking, management or security. For example, the communication groups for a theater production may include different communication groups for stage crew, audio-visual crew, front-of-house, director, etc. System 100 may be used in other contexts where people work together, including but not limited to theme park ride management, medical operating room communications, football coach communications, factory floor communications, and/or other contexts.

Figure 3A:
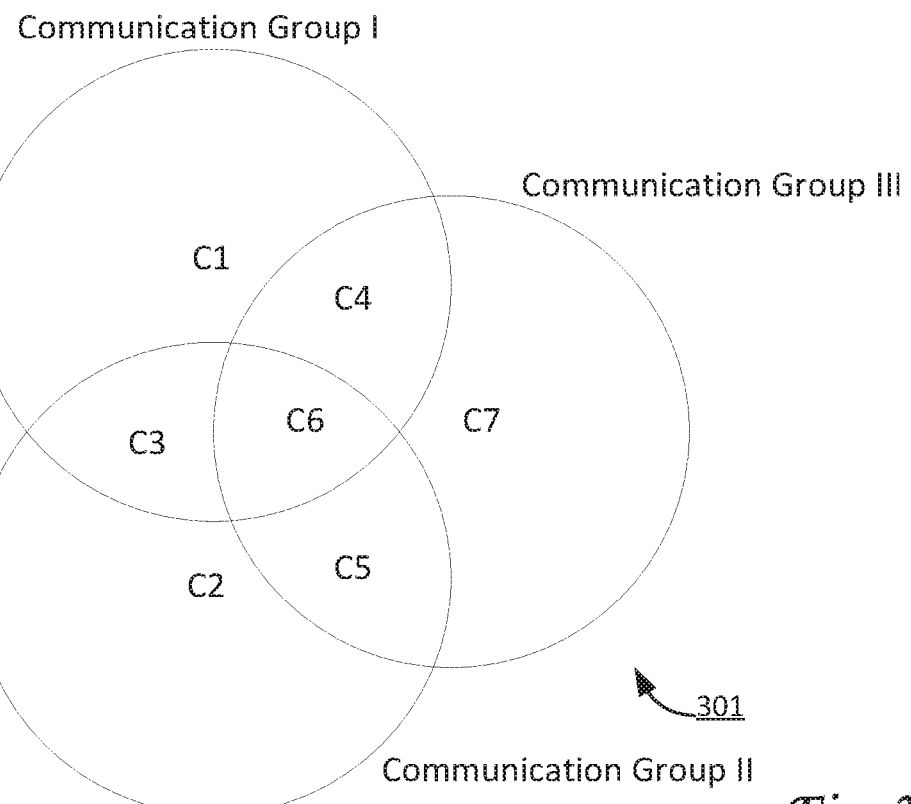
FIGS. 3A-3B-3C-3D illustrate exemplary sets of communication groups as may be used by a system configured for assigning voice communication channels used by a group of people, in accordance with one or more implementations.

Voice communication channels managed by system 100 may facilitate communication among and/or between specific (sets of) communication groups. By way of non-limiting example, FIG. 3A illustrates an exemplary set 301 of three communication groups that are specific to different (types of) roles and/or locations in a work area, such as a quick-service restaurant. The first communication group is indicated by the label "Communication Group I". The second communication group is indicated by the label "Communication Group II". The third communication group is indicated by the label "Communication Group III". Communication for different subsets of these three communication groups may use seven different voice communication channels as depicted (though the numbering used for these voice communication channels is exemplary and not intended to be limiting). The voice communication channels in overlap areas in FIG. 3A include mixed communications.

Figure 3B:
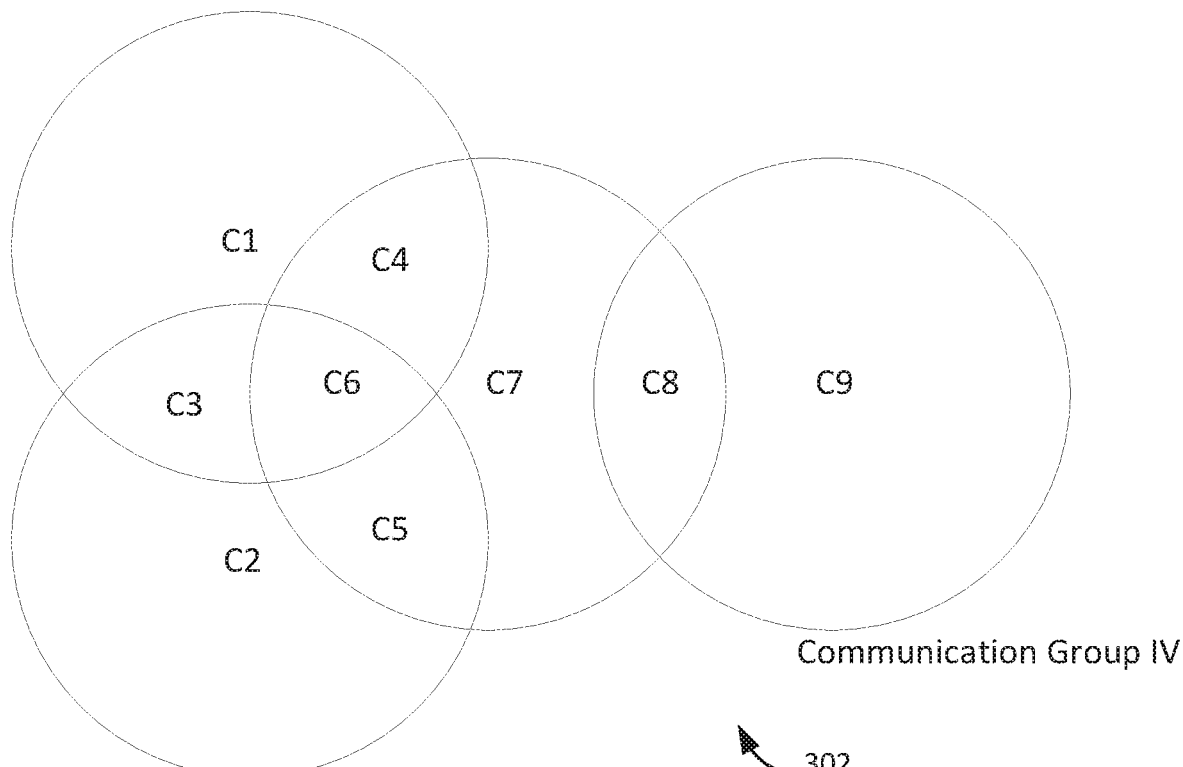

Communication (targeted) to just the first communication group may use, at least, a first voice communication channel "C1", in addition to other voice communication channels associated with the first communication group. Communication to just the second communication group may use, at least, a second voice communication channel "C2", in addition to other voice communication channels associated with the second communication group. Communication to both the first and second communication groups may use a third voice communication channel "C3" (in other words, C3 includes communications targeted to the first communication group mixed with communications targeted to the second communication group). Communication to just the third communication group may use, at least, a seventh voice communication channel "C7", in addition to other voice communication channels associated with the third communication group. Communication to both the first and third communication groups may use a fourth voice communication channel "C4" (in other words, C4 includes communications targeted to the first communication group mixed with communications targeted to the third communication group). Communication to both the second and third communication groups may use a fifth voice communication channel "C5" (in other words, C5 includes communications targeted to the second communication group mixed with communications targeted to the third communication group). Communication to the first, second, and third communication groups may use a sixth voice communication channel "C6" (in other words, C6 includes communications targeted to the first communication group mixed with communications targeted to the second communication group and communications targeted to the third communication group). In some implementations, a user in the first communication group could target, direct, and/or transmit a voice message/communication to any of the communication groups, but would only receive voice messages/communication targeted, directed, and/or transmitted to the first communication group (e.g., the user can select the first, third, fourth, or sixth broadcast channel, depending on which other communication groups are to be added/included). In some implementations, all users in the same communication group may have access to and can listen to the same voice communication channels. In some implementations, there may be no (predetermined) limit to how many different users can listen to the same voice communication channel simultaneously. A user in the second communication group would only receive voice messages/communication targeted, directed, and/or transmitted to the second communication group (e.g., the user can select the second, third, fifth, or sixth broadcast channel, depending on which other communication groups are to be added/included). A user in the third communication group would only receive voice messages/communication targeted, directed, and/or transmitted to the third communication group (e.g., the user can select the fourth, fifth, sixth, or seventh broadcast channel, depending on which other communication groups are to be added/included). By way of non-limiting example, FIG. 3B illustrates an exemplary set 302 of four communication groups that are specific to different (types of) roles and/or locations in a work area, such as a quick-service restaurant. Exemplary set 302 is similar to set 301 of FIG. 3A, with an added fourth communication group, indicated by the label "Communication Group IV". Communication to just the fourth communication group may use, at least, a ninth voice communication channel "C9", in addition to other voice communication channels associated with the fourth communication group. Communication to both the third and fourth communication groups may use an eighth voice communication channel "C8" (in other words, C8 includes communications targeted to the third communication group mixed with communications targeted to the fourth communication group). In some implementations, a user in the fourth communication group could target, direct, and/or transmit a voice message/communication to any of the communication groups, but would only receive voice messages/communication targeted, directed, and/or transmitted to the fourth communication group (e.g., the user can select the eighth or ninth broadcast channel, depending on which other communication groups are to be added/included). In this case, the user in the third communication group could additionally select the eighth voice communication channel.

Referring to FIG. 1, central communication device 101 (also referred to as central communication hub) and/or information processing unit(s) 102 may be configured to communicate with one or more communication devices 104 according to a client/server architecture, a point-to-point architecture, and/or other architectures. Communication device(s) 104 (which may be referred to as end-user communication devices) may be configured to communicate with other communication devices 104 via central communication device 101, information processing unit(s) 102, and/or other components of system 100. Users may access system 100 via communication devices 104. Communication devices 104 may include a first communication device 104a, a second communication device 104b, a third communication device 104c, and/or other communication devices. First communication device 104a may be associated with a first user, second communication device 104b may be associated with a second user, third communication device 104c may be associated with a third user, and so forth. In some implementations, communication between communication devices 104 may be performed on a local communications network, such as, by way of non-limiting example, a local area network. Alternatively, and/or simultaneously, in some implementations, the local communications network may include a personal area network. For example, the local communications network may be used in a restaurant, a service location, a theater, an office, a building, a construction site, and/or in other localized areas. In some implementations, communication between communication devices 104 is performed via central communication device 101, which communicates with base station 103. For example, communication between communication devices 104 may be performed without using one or more networks 13.

Central communication device 101 may include one or more of information processing units 102, electronic storage 122, a first antenna 101a, a second antenna 101b, and/or other components. In some implementations, central communication device 101 may be referred to as a remote and/or fixed communication device. In some implementations, central communication device 101 may be configured to facilitate localized communications in a local communications network among a set of communication devices 104, such as, by way of non-limiting example, first communication device 104a, second communication device 104b, third communication device 104c, and/or other communication devices. In some implementations, individual antennas of central communication device 101 may be configured to operate in conjunction with individual transceivers that are included in central communication device 101 (not depicted). In implementations using two separate antennas and two separate transceivers, communications by central communication device 101 may be improved (by way of non-limiting example, in terms of reliability, audio quality, and/or other quality factors) by providing different types of diversity. The different types of diversity may include one or more of antenna diversity, transceiver diversity, spatial diversity (e.g., if multiple antennas on central communication device 101 are disposed and/or positioned in different locations), frequency diversity, channel diversity, time diversity, and/or other types of diversity. In some implementations using one antenna and transceiver for communications by central communication device 101 with set of communication devices 104, the different types of diversity may include, e.g., frequency diversity and time diversity.

Communications between central communication device 101 and one or more communication devices 104 may be based on the exchange of packets of information that are formatted in one or more particular formats. As used herein, the direction from one or more base stations 103 via central communication device 101 to one or more communication devices 104 may be referred to as downlink and/or downstream. As used herein, the direction from one or more communication devices 104 via central communication device 101 to one or more base stations 103 may be referred to as uplink and/or upstream. Accordingly, information provided through uplink communication may be referred to as uplink information, information provided through downlink communication may be referred to as downlink information. In some implementations, packets may be formatted using a format based on the (IEEE) 802.11 family of standards. In some implementations, packets may have a proprietary format. In some implementations, downlink packets may be transmitted to multiple communication devices 104 at once. In some implementations, uplink packets may be device-specific packets that are transmitted by a particular communication device 104 (e.g., at a particular time). Packetized communication may have overhead, e.g., due to the use of header information, which may reduce the efficiency of the communication. Downlink packets may be more efficient than uplink packets, since information for multiple communication devices 104 may be transmitted at once, whereas in some implementations, uplink packets may only contain information from a single communication device 104.

Central communication device 101 may use different communication protocols, communication formats, and/or communication links to communicate with different ones (and/or different types) of communication devices 104 and/or other components of system 100. For example, central communication device 101 may use a primary (wireless) communication link to communicate with first communication device 104a. In some implementations, central communication device 101 may use first antenna 101a (and a corresponding transceiver) to transmit and/or receive information over the primary communication link, using a first frequency range. In some implementations, central communication device 101 may use second antenna 101b (and a corresponding transceiver) to transmit and/or receive information over the primary communication link, using a second frequency range. In some implementations, central communication device 101 may use different antennas to transmit and/or receive information over different communication links, e.g., using different communication standards and/or formats. For example, central communication device 101 may use a secondary communication link to communicate with base station 103. In some implementations, communication via the secondary communication link may be based on the Ethernet family of standards. In some implementations, communication via the secondary communication link may be based on a proprietary format. In some implementations, communication over the secondary communication link may be point-to-point. In some implementations, communication over the secondary communication links may be supported in system 100 without the need or use of cellular networks or public networks. In some implementations, central communication device 101 and/or base station 103 may support additional communication links for firmware updates, monitoring, maintenance, configuration, and/or other types of communication.

By way of non-limiting example, central communication device 101 may use a particular wireless communication link to communicate with one or more client communication devices 104, including but not limited to first communication device 104a, second communication device 104b, third communication device 104c, and/or other communication devices. In some implementations, communication (in particular registration and configuration) via this wireless communication link may include communication based on a short-range wireless communication protocol, contact-less information, and/or near-field communication (NFC). In some implementations, central communication device 101 may use a separate antenna (not depicted) to transmit and/or receive information over this particular communication link. In some implementations, communication over this particular communication link may be supported in system 100 without the need or use of cellular networks or public networks.

System 100 may include electronic storage 122. Electronic storage 122 may comprise non-transitory storage media that electronically stores information. The electronic storage media of electronic storage 122 may include one or both of system storage that is provided integrally (i.e., substantially non-removable) with information processing unit(s) 102 and/or removable storage that is removably connectable to information processing unit(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from information processing unit(s) 102, information received from communication device(s) 104, and/or other information that enables information processing unit(s) 102 to function as described herein.

In some implementations, information stored in electronic storage 122 may include information that represents associations of individual voice communication channels with one or more communication groups. The individual ones of the one or more communication groups may be specific to one or more roles of people and/or employees, e.g. employees in a quick-service restaurant. The individual ones of the one or more communication groups may be specific to one or more types of roles of interacting people and/or employees, e.g. employees in a quick-service restaurant. In some implementations, individual associations are between individual voice communication channels and individual subsets of the set of communication groups. The one or more communication groups may include one or more of a first communication group, a second communication group, a third communication group, a fourth communication group, and so forth.

In some implementations, the associations may include a first association between a first voice communication channel and a first communication group. The first communication group may be specific to (a first type of) roles in the quick-service restaurant that are related to a first drive-through lane. In some implementations, the associations may include a second association between a second voice communication channel and a second communication group. The second communication group may be specific to (a second type of) roles in the quick-service restaurant that are related to a second drive-through lane. In some implementations, the associations may include a third association between a third voice communication channel and the first and second communication groups. In some implementations, the associations may include a fourth association between a fourth voice communication channel and the first communication group and a third communication group. The third communication group may be specific to (a third type of) roles in the quick-service restaurant that are related to food production. In some implementations, the associations may include a fifth association between a fifth voice communication channel and the second and third communication groups. In some implementations, the associations may include a sixth association between a sixth voice communication channel and the first, second, and third communication groups. In some implementations, the associations may include a seventh association between a seventh voice communication channel and the third communication group. In some implementations, the associations may include an eighth association between an eighth voice communication channel and the third communication group and a fourth communication group. The fourth communication group may be specific to (a fourth type of) roles in the quick-service restaurant that are related to the front counter. In some implementations, the associations may include a ninth association between a ninth voice communication channel and the fourth communication group. For example, these nine voice communication channels may correspond to exemplary set of communication groups 302 of FIG. 3B. Different sets of communication groups (overlapping in different ways) may use voice communication channels differently as needed, using a different set of associations. In some implementations, the usage of the communication channels may be further restricted as needed for certain roles or groups or subsets of crew members. For example, in some implementations, some crew members may only be able to listen to one or more voice communication channels (e.g., only use C1, or only use C2). Some crew members may be able to switch between all available communication groups, whereas other crew members may be more restricted in usage and/or switching.

Information processing unit(s) 102 may be configured by machine-readable instructions 106. Machine-readable instructions 106 may include one or more instruction components. The instruction components may include computer program components. The instruction components may include one or more of an input component 116, an assignment component 118, a configuration component 120, a packet generating component 108, a packet transmission component 110, a packet receiving component 112, a channel mapping component 114, an audio mixing component 126, and/or other instruction components. In some implementations, one or more of the instruction components may be part of other information processing units, including but not limited to information processing units 102a of base station 103.

Input component 116 may be configured to receive and/or otherwise obtain user input from users. For example, input component 116 may receive first user input from a first user, second user input from a second user, third user input from a third user, and so forth. User input may identify one or more types of information, including but not limited to information that identifies a given employee, information that identifies a given role of a given employee, information that identifies a given communication group associated with a given employee, information that identifies a given communication group associated with a given client computing device, and/or other information. For example, a first employee may enter and/or select their name, their ID, their employee number, their badge number, and/or any other identification that is uniquely related to themselves, and by doing so, input component 116 may receive this input and/or information based thereon. For example, the first employee could enter his name (say, "John"), or employee number (say, "12345"), but, alternatively, and/or simultaneously, the first employee could enter a role (say, "cashier for Lane 1"), a type of role ("taking orders for first drive-through lane"), a communication group (say "Communication Group III"), and/or other information that may be used to automatically assign voice communication channels as described herein. In some implementations, system 100 may be configured to correlate an employee's identification with a particular role (e.g., for the upcoming shift of work), such as, by way of non-limiting example, a role specific to the first drive-through lane at the quick-service restaurant. At a different time or day, the same employee may be associated with a different role. Different roles (or types of roles) may use different communication groups, and may therefore be associated with and/or assigned to different voice communication channels. In some implementations, system 100 may be configured to associate an identified role (or type of role) with a given subset of communication groups. In some implementations, system 100 may be configured to assign different voice communication channels based on an identified communication group. In some implementations, user input may be entered and/or selected at base station 103 (e.g., through a user interface). In some implementations, user input may be received by input component 116 subsequent to a given user registering a given communication device (e.g., a headset) with base station 103 (e.g., prior to a shift of work starting). In some implementations, subsequent to registration of the given communication device, system 100 may configure the given communication device such that the given user can communicate with other users (in particular, in accordance with the specific role of the given user).

Assignment component 118 may be configured to automatically determine sets of communication channel assignments for communication devices 104. In some implementations, assignments may be based on user input received by input component 116. In some implementations, assignments may be role-specific, based on user input received by input component 116. In some implementations, individual communication channels may be assigned to individual subsets of communication groups. For example, for a given employee, assignment component 118 may determine a set of four communication channel assignments (e.g., assignments for a first, second, third, and fourth communication channel, to subsets of a set of a first, second, and third communication groups). The first communication channel may be assigned to the first communication group. The second communication channel may be assigned to the subset of the first and second communication groups. The third communication channel may be assigned to the subset of the first and third communication groups. The fourth communication channel may be assigned to the set of first, second, and third communication groups. By way of non-limiting example, these assignments are depicted for an employee in Communication Group I in FIG. 3A (though the first though fourth communication channels as described here are labeled C1, C3, C4, and C6, respectively). Additionally, by way of non-limiting example, FIG. 5A illustrates three sets of assignments for employees in each of the first, second, and third communication group. The first through fourth communication channels (as may be selected by a user) have been arbitrarily labeled "A", "B", "C", and "D". The first column in FIG. 5A depicts the same assignments as described here for an employee in the first communication group (here, the channel labels are not considered a column). By way of non-limiting example, FIG. 3A also depicts a set of four communication channel assignments for an employee in the second communication group (Communication Group II), where the first though fourth communication channels as may be selected are labeled C2, C3, C5, and C6, respectively, matching the second column in FIG. 5A. By way of non-limiting example, FIG. 3A also depicts a set of four communication channel assignments for an employee in the third communication group (Communication Group III), where the first though fourth communication channels as may be selected are labeled C7, C4, C5, and C6, respectively, matching the third column in FIG. 5A. In some implementations, assignment component 118 may be configured to support dynamic communication channel assignments based on a given user modifying his or her primary role and/or communication group. For example, the given user may be allowed to switch between the first and second communication groups, listening to C4 before the switch, and listening to C5 after the switch.

By way of non-limiting example, FIG. 3B illustrates an exemplary set 302 of four communication groups that are specific to different (types of) roles and/or locations in a work area, such as a quick-service restaurant. Exemplary set 302 is similar to set 301 of FIG. 3A, with an added fourth communication group, indicated by the label "Communication Group IV". For example, for a given employee, assignment component 118 may determine a set of up to five communication channel assignments (e.g., assignments for a first, second, third, fourth, and fifth communication channel, labeled "A" to "E", to subsets of a set of a first, second, third, and fourth communication groups). The assignments for the first and second communication groups may be similar to the depiction in FIG. 5A. Additionally, for an employee in the third communication group, a fifth communication channel labeled C8 may be assigned to the set of third and fourth communication groups, as depicted in the third column of FIG. 5B. For an employee in the fourth communication group, two communication channels labeled C9 and C8 may be assigned as shown in FIG. 3B, and depicted in the fourth column of FIG. 5B.

Figure 3C:
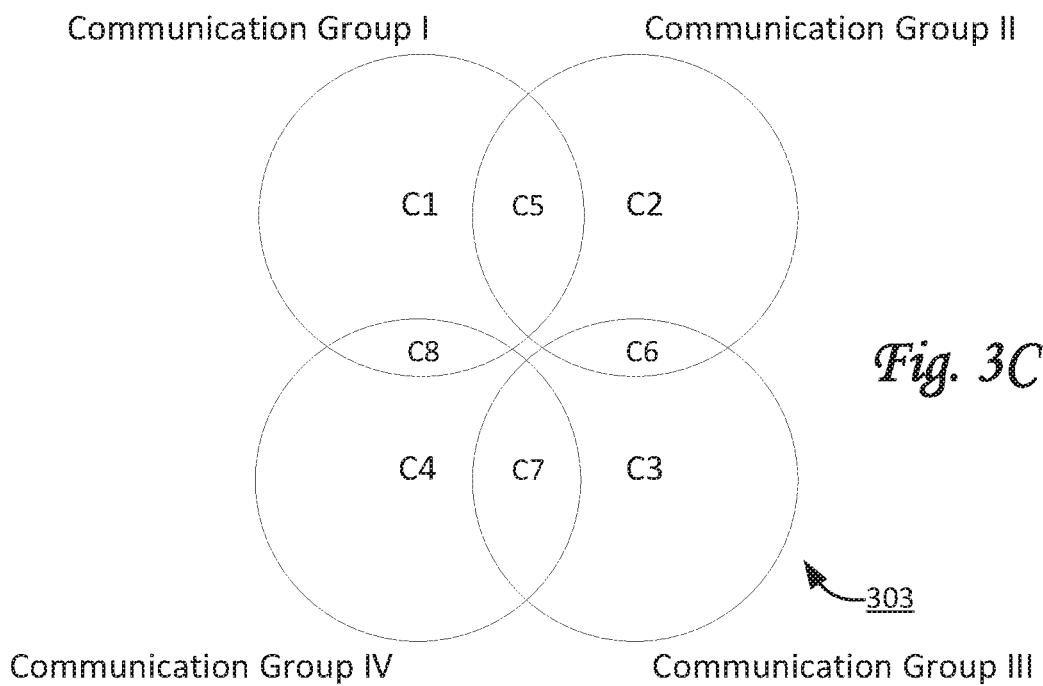

By way of non-limiting example, FIG. 3C illustrates an exemplary set 303 of four communication groups that are specific to different (types of) roles and/or locations in a work area, such as a quick-service restaurant. For a given employee, assignment component 118 may determine a set of three communication channel assignments (assignments for a first, second, and third communication channel, to subsets of a set of a first, second, third, and fourth communication groups). The first communication channel may be assigned to the first communication group. The second communication channel may be assigned to the second communication group. The third communication channel may be assigned to the third communication group. The fourth communication channel may be assigned to the fourth communication group. The fifth through eighth communication channel may be assigned to subsets of the four communication groups, as depicted in FIG. 3C. For an employee in Communication Group I in FIG. 3C the three communication channels as assigned are labeled C1, C5, and C8. For an employee in Communication Group II in FIG. 3C the three communication channels as assigned are labeled C2, C5, and C6. For an employee in Communication Group III in FIG. 3C the three communication channels as assigned are labeled C3, C6, and C7. For an employee in Communication Group IV in FIG. 3C the three communication channels as assigned are labeled C4, C7, and C8. Additionally, by way of non-limiting example, FIG. 5C illustrates four sets of assignments for employees in each of the first, second, third, and fourth communication group. The first through third communication channels have been arbitrarily labeled "A", "B", and "C". The first column in FIG. 5C depicts the same assignments as described here for an employee in the first communication group. The second column in FIG. 5C depicts the same assignments as described here for an employee in the second communication group. The third column in FIG. 5C depicts the same assignments as described here for an employee in the third communication group. The fourth column in FIG. 5C depicts the same assignments as described here for an employee in the fourth communication group.

Figure 3D:
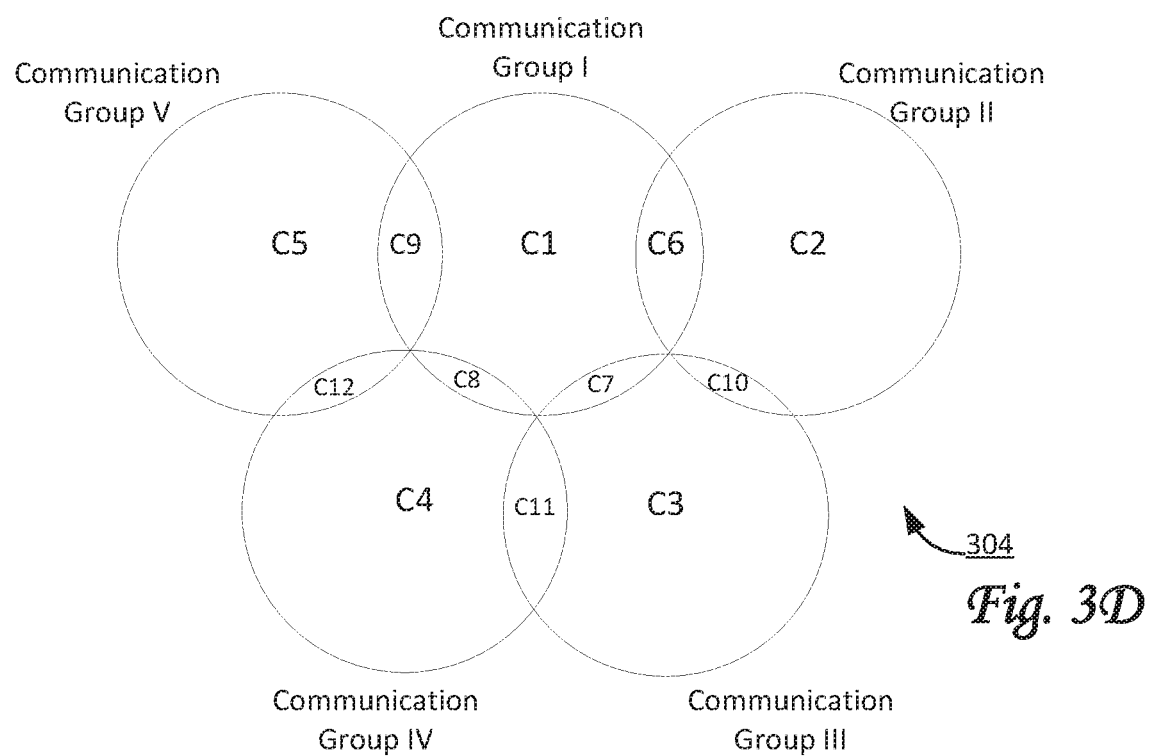

By way of non-limiting example, FIG. 3D illustrates an exemplary set 304 of five communication groups that are specific to different (types of) roles and/or locations in a work area, such as a quick-service restaurant. Communication for different subsets of these five communication groups may use twelve different voice communication channels as depicted. For a given employee, assignment component 118 may determine a set of communication channel assignments to subsets of the communication groups. For employees in each of the five communication groups, up to five communication channels are assigned as depicted, matching the same assignments in FIG. 5D.

Configuration component 120 may be configured to configure communication devices 104 (e.g., control settings for communication using those communication devices). Communication devices 104 may be configured by configuration component 120 according to assignments determined by assignment component 118. For example, configuration information may be transmitted to communication device 104 and stored locally on communication devices 104. For example, configuration instructions may be transmitted to communication device 104 and executed locally on communication devices 104. For example, for a given employee (associated with a given communication device 104) in the first communication group in FIG. 3A, the communication channels labeled "A" to "D" of the given communication device may be configured according to the first column in FIG. 5A, enabling channel selections of "A" to "D" by the given employee for communication with other employees. For a different employee (associated with a different communication device 104) in the second communication group in FIG. 3A, the communication channels labeled "A" to "D" of the different communication device may be configured according to the second column in FIG. 5A, enabling channel selections of "A" to "D" by the different employee for communication with other employees. For another employee (associated with another communication device 104) in the third communication group in FIG. 3A, the communication channels labeled "A" to "D" of the other communication device may be configured according to the third column in FIG. 5A, enabling channel selections of "A" to "D" by the other employee for communication with employees. In some implementations, configuration information may be transmitted using the same communication links as used to exchange device-specific packets. In some implementations, configuration information may be transmitted using one or more different communication links as used to exchange device-specific packets, such as, e.g., a communication link based on near-field communication (NFC).

Referring to FIG. 1, packet receiving component 112 may be configured to receive packets, including but not limited to downlink packets, device-specific packets, and/or other packets. Receipt of packets may be scheduled, arranged, and/or otherwise timed in specific time periods. In some implementations, central communication device 101 may be configured to receive one or more device-specific packets. For example, packet receiving component 112 may receive multiple device-specific packets per timeframe, such as a first, second, third, fourth, fifth, sixth, seventh, eighth, nineth, tenth, and/or other device-specific packets, e.g., from different communication devices 104.

For example, a first device-specific packet may be received by first central antenna 101a, e.g., during a first uplink time period that occurs within a first timeframe. The first device-specific packet may be received from first communication device 104a. The first device-specific packet may include packetized uplink information based on audio and/or video information captured by first communication device 104a. The audio and/or video information captured by the first communication device may be part of audio communication (through system 100) between different users. The first device-specific packet may be targeted to a given communication group, such as, e.g., a first communication group. By way of non-limiting example, individual communication groups may be associated with one or more voice communication channels selected from a set of broadcast communication channels. Individual ones of the one or more communication groups may be specific to one or more (types of) roles of people interacting within a group of people, such as a crew of employees in a quick-service restaurant. For example, in reference to FIG. 3A, audio information in a device-specific packet targeted to the first communication group may be included in the first, third, fourth, and sixth broadcast channels.

Packet receiving component 112 may be configured to receive a second device-specific packet, e.g., during a second uplink time period that occurs within the first timeframe or within a second timeframe. In some implementations, the second uplink time period may occur subsequent to the occurrence of the first uplink time period. The second device-specific packet may be received from second communication device 104b. The second device-specific packet may include packetized uplink information based on audio and/or video information captured by second communication device 104b. The audio and/or video information captured by second communication device 104b may be part of audio communication (through system 100) between different users. The second device-specific packet may be targeted to a given communication group, such as, e.g., the second voice communication channel. For example, in reference to FIG. 3A, audio information in a device-specific packet targeted to the second communication group may be included in the second, third, fifth, and sixth broadcast channels.

Packet receiving component 112 may be configured to receive a third device-specific packet, e.g., during a third uplink time period that occurs within the first timeframe, the second timeframe, or within a third timeframe. In some implementations, the third uplink time period may occur subsequent to the occurrence of the first and second uplink time periods. The third device-specific packet may be received from third communication device 104c. The third device-specific packet may include packetized uplink information based on audio and/or video information captured by third communication device 104c. The audio and/or video information captured by third communication device 104c may be part of audio communication (through system 100) between different users. The third device-specific packet may be targeted to a given communication group, such as, e.g., the third communication group. For example, in reference to FIG. 3A, audio information in a device-specific packet targeted to the third communication group may be included in the fourth, fifth, sixth, and seventh broadcast channels. And so forth for additional device-specific packets.

By way of non-limiting example, FIG. 4 illustrates an exemplary timeframe 401 having a top portion and a bottom portion (using different sections of the same frequency range), with the top portion showing a first, second, and third through tenth time period (for device-specific packets ULS0, ULS1, ULS2, through ULS10 in chronological order). The bottom section shows the same packets being transmitted at a later time. In some implementations, time frames may include at least 11 device-specific packets. For example, in some implementations, individual time frames may include 13 slots of which 10 are used for device-specific packets.

Referring to FIG. 1, packet generating component 108 may be configured to generate packets, including but not limited to downlink packets, device-specific packets, and/or other packets. In some implementations, downlink packets may include a first downlink packet, a second downlink packet, a third downlink packet, and/or other downlink packets. In some implementations, one or more broadcast and/or downlink packets may be generated by central communication device 101. In some implementations, one or more downlink packets may be generated by base station 103. Individual downlink packets may include packetized downlink information. By way of non-limiting example, (contents of) packetized downlink information may be based on audio and/or video information that was previously (e.g., in a previous timeframe) included in one or more other packets, e.g., one or more device-specific packets and/or other uplink information. In some implementations, individual downlink packets may include packetized downlink information that is organized in a set of broadcast channels. In some implementations, individual downlink packets may have a target and/or destination indication that indicates a network destination in the local communications network for the included packetized downlink information. For example, the network destination may include and/or indicate one or more specific communication devices 104, and/or other destinations. The set of broadcast channels may include a first broadcast channel, a second broadcast channel, a third broadcast channel, and so forth. Individual broadcast channels may be used for previously received audio information that was targeted to one or more communication groups that are associated with one or more voice communication channels selected from a set of broadcast communication channels. For example, the first broadcast channel may be used for audio information targeted to the first communication group (in accordance with exemplary set of communication groups 301 of FIG. 3A, and the corresponding associations between individual voice communication channels and subsets of the set of communication groups). For example, the second broadcast channel may be used for audio information targeted to the second communication group (in accordance with exemplary set of communication groups 301 of FIG. 3A). For example, the third broadcast channel may be used for audio information targeted, at least, to one of the first and second communication groups (in accordance with exemplary set of communication groups 301 of FIG. 3A). For example, the fourth broadcast channel may be used for audio information targeted, at least, to one of the first and third communication groups (in accordance with exemplary set of communication groups 301 of FIG. 3A). For example, the fifth broadcast channel may be used for audio information targeted, at least, to one of the second and third communication groups (in accordance with exemplary set of communication groups 301 of FIG. 3A). For example, the sixth broadcast channel may be used for audio information targeted, at least, to one of the first through third communication groups (in accordance with exemplary set of communication groups 301 of FIG. 3A). For example, the seventh broadcast channel may be used for audio information targeted to the third communication group (in accordance with exemplary set of communication groups 301 of FIG. 3A). In some implementations, device-specific packets may be generated by individual communication devices 104.

By way of non-limiting example, FIG. 4 illustrates an exemplary timeframe 401 having a top portion and a bottom portion (using different sections of the same frequency range), with the top portion showing a first downlink packet labeled "BP0", which includes the first through tenth broadcast channels, labeled "B1" to "B10". The indicated use of ten broadcast channels is exemplary and not intended to be limiting. In some implementations, downlink packets may include at least 10 broadcast channels.

Referring to FIG. 1, in some implementations, packet generating component 108 may be configured to generate downlink packets that include packetized downlink information that is organized in a set of dedicated channels. In some implementations, individual dedicated channels may have a target and/or a destination that is a specific communication device 104, such that the audio information on an individual dedicated channel excludes audio information received from the specific communication device 104. As a result, the user of the specific communication device 104 will not receive an echo through the individual dedicated channel of their own audio. For example, a first dedicated channel may include the same audio information as the first broadcast channel, minus the audio information received from first communication device 104a (for example, if the audio information from first communication device 104a targeted the first communication group, the first dedicated channel would include the audio information targeted to the first communication group). For example, a second dedicated channel may include the same audio information as the second broadcast channel, minus the audio information received from second communication device 104b (for example, if the audio information from second communication device 104b targeted the second communication group, the second dedicated channel would include the audio information targeted to the second communication group). For example, a third dedicated channel may include the same audio information as the third broadcast channel, minus the audio information received from third communication device 104c (for example, if the audio information from third communication device 104c targeted the third communication group, the second dedicated channel would include the audio information targeted to the third communication group), and so forth.

By way of non-limiting example, FIG. 4 illustrates an exemplary timeframe 401 having a top portion and a bottom portion (using different sections of the same frequency range), with the top portion showing a first downlink packet labeled "BP0", which includes the first through tenth dedicated channels, labeled "D1" to "D10", in addition to broadcast channels. The indicated use of ten dedicated channels is exemplary and not intended to be limiting. The bottom portion also shows downlink packet labeled "BP0", which may be transmitted at a different time and may be transmitted on a different frequency. In some implementations, there may be a predetermined limit to how many different users can speak to the same voice communication channel simultaneously, which may match the number of dedicated channels.

Referring to FIG. 1, packet transmission component 110 may be configured to transmit packets, including but not limited to downlink packets, device-specific packets, and/or other packets. Transmission of packets may be scheduled, arranged, and/or otherwise timed in specific time periods. As used herein, time periods are periods of time, having a specified and/or limited duration. A set or sequence of time periods may be scheduled, arranged, and/or otherwise timed to occur in particular timeframes. In some implementations, different periods in a set or sequence may not overlap. For example, the duration of individual timeframes may be between 1 and 3 ms, between 4 and 6 ms, about 5 ms, between 5 and 10 ms, between 8 and 12 ms, about 10 ms, about 15 ms, between 10 and 20 ms, and/or another duration. In some implementations, individual time periods may include time slots.

In some implementations, downlink packets may be transmitted by central communication device 101. For example, a first downlink packet may be transmitted via first central antenna 101a (of the first central transceiver) of central communication device 101 to a set of communication devices 104. For example, a second downlink packet may be transmitted to the same set of communication devices 104. In some implementations, the first and second downlink packets may be transmitted in different time periods during the same timeframe. In some implementations, individual timeframes may include two downlink packets. In some implementations, individual timeframes may include more than two downlink packets. Transmission of the first downlink packet may use a first channel of a first frequency range. As used herein, channels are designated sub-ranges within a frequency range, commonly having equal bandwidths and/or equally-spaced-apart bandwidths. For example, transmission of the second downlink packet may use a second channel of the first frequency range (wherein the first channel is different from the second channel). For example, the frequency range may be 900 MHz, 1.9 GHz, 2.4 GHz, 5 GHz, and/or at least 5 GHz. In some implementations, individual channels of a particular frequency range may use a 5 MHz bandwidth per channel, 10 MHz, 20 MHz, 40 MHz, and/or use another bandwidth per channel. By way of non-limiting example, for the 5 GHz frequency range, so-called channel 36 may range from 5170 to 5190 MHz, channel 46 may range from 5210 to 5250 MHz, and so forth.

In some implementations, device-specific packets may be transmitted by individual communication devices 104. For example, a first device-specific packet may be transmitted via an antenna 105a (of a transceiver) of first communication device 104a. For example, a second device-specific packet may be transmitted via an antenna 105b (of a different transceiver) of second communication device 104b. For example, a third device-specific packet may be transmitted via antenna 105c (of yet a different transceiver) of third communication device 104c. In some implementations, the first, second, and third device-specific packets may be transmitted in different time periods and/or during the same timeframe. For example, transmission of the first device-specific packet may use the first channel of the first frequency range. For example, transmission of the second device-specific packet may use the first channel of the first frequency range. For example, transmission of the third device-specific packet may use the first channel of the first frequency range.

In some implementations, channel mapping component 114 may be configured to determine mappings between individual communication groups (as targeted by device-specific packets) and individual broadcast channels. For example, the selection of individual broadcast channels may be in accordance with a particular selection from the set of communication groups. In some implementations, channel mapping component 114 may be configured to determine mappings between individual voice communication channels (as targeted by device-specific packets) and individual dedicated channels in downlink packets. In some implementations, determinations by channel mapping component 114 may be based on a particular set of communications groups, as for example depicted in FIGS. 3A-3B-3C-3D.

Audio mixing component 126 may be configured to mix audio information from different communication devices 104 (as received through device-specific packets) into individual broadcast channels, dedicated channel, and/or other channels. In some implementations, audio mixing component 126 may operate based on determinations made by channel mapping component 114. By way of non-limiting example, FIG. 3C illustrates exemplary set 303 of four communication groups that are specific to different (types of) roles and/or locations in a work area, such as a quick-service restaurant. The first communication group is indicated by the circle with label "C1" in the center, the second communication group is indicated by the circle with label "C2" in the center, the third communication group is indicated by the circle with label "C3" in the center, and the fourth communication group is indicated by the circle with label "C4" in the center. Communication for different subsets of these four communication groups may use eight different voice communication channels as depicted. Communication to at least the first communication group may use a first, fifth, and eighth voice communication channel. Communication to at least the second communication group may use a second, fifth, and sixth voice communication channel. Communication to at least the third communication group may use a third, sixth, and seventh voice communication channel. Communication to at least the fourth communication group may use a fourth, seventh, and eighth voice communication channel. Users interested in communication to both the first and second communication groups may select the fifth voice communication channel "C5". Users interested in communication to both the second and third communication groups may select the sixth voice communication channel "C6". Users interested in communication to both the third and fourth communication groups may select the seventh voice communication channel "C7". Users interested in communication to both the fourth and first communication groups may select the eighth voice communication channel "C8".

By way of non-limiting example, FIG. 3D illustrates exemplary set 304 of five communication groups that are specific to different (types of) roles and/or locations in a work area, such as a quick-service restaurant. Communication for different subsets of these five communication groups may use twelve different voice communication channels as depicted.

Referring to FIG. 1, a given communication device 104 may include one or more processors configured to execute computer program components. The computer program components may be configured to enable an expert or user associated with the given communication device 104 to interface with system 100 and/or external resources 121, and/or provide other functionality attributed herein to communication device(s) 104. By way of non-limiting example, the given communication device 104 may include one or more of a desktop computer, a laptop computer, a handheld computer, a tablet computing platform, a NetBook, a Smartphone, a smart watch/band, a belt pack, a headset, an ear bud, a gaming console, and/or other computing platforms.

External resources 121 may include sources of information outside of system 100, external entities participating with system 100, and/or other resources. In some implementations, some or all of the functionality attributed herein to external resources 121 may be provided by resources included in system 100.

Information processing unit(s) 102 may include electronic storage 122, one or more processors 124, and/or other components. Information processing unit(s) 102 may include communication lines, or ports to enable the exchange of information with a network and/or other computing platforms. Illustration of information processing unit(s) 102 in FIG. 1 is not intended to be limiting. Information processing unit(s) 102 may include a plurality of hardware, software, and/or firmware components operating together to provide the functionality attributed herein to information processing unit(s) 102. For example, information processing unit(s) 102 may be implemented by a cloud of computing platforms operating together as information processing unit(s) 102. In some implementations, individual information processing units may be servers.

User interfaces 140 may be configured to facilitate interaction between users and system 100 and/or between users and communication devices 104. For example, user interfaces 140 may provide an interface through which users may provide information to and/or receive information from system 100. In some implementations, user interface 140 may include one or more of a display screen, touchscreen, monitor, a keyboard, buttons, switches, knobs, levers, mouse, speakers, headphones, microphones, sensors to capture voice commands, sensors to capture eye movement and/or body movement, sensors to capture hand and/or finger gestures, and/or other user interface devices configured to receive and/or convey user input. In some implementations, one or more user interfaces 140 may be included in one or more communication devices 104. In some implementations, one or more user interfaces 140 may be included in system 100.

Referring to FIG. 1, processor(s) 124 may be configured to provide information processing capabilities in information processing unit(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, 116, 118, 120, and/or 126, and/or other components. Processor(s) 124 may be configured to execute components 108, 110, 112, 114, 116, 118, 120, and/or 126, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 126 are illustrated in FIG. 1 as being implemented within a single processing unit, in implementations in which processor(s) 124 includes multiple processing units, one or more of components 108, 110, 112, 114, 116, 118, 120, and/or 126 may be implemented remotely from the other components. The description of the functionality provided by the different components 108, 110, 112, 114, 116, 118, 120, and/or 126 described below is for illustrative purposes, and is not intended to be limiting, as any of components 108, 110, 112, 114, 116, 118, 120, and/or 126 may provide more or less functionality than is described. For example, one or more of components 108, 110, 112, 114, 116, 118, 120, and/or 126 may be eliminated, and some or all of its functionality may be provided by other ones of components 108, 110, 112, 114, 116, 118, 120, and/or 126. As another example, processor(s) 124 may be configured to execute one or more additional components that may perform some or all of the functionality attributed below to one of components 108, 110, 112, 114, 116, 118, 120, and/or 126.

In some implementations, central communication device(s) 101, information processing unit(s) 102, communication device(s) 104, and/or external resources 121 may be operatively linked via one or more electronic communication links. For example, such electronic communication links may be established, at least in part, via one or more wireless connections, via one or more networks 13 and/or other networks. It will be appreciated that this is not intended to be limiting, and that the scope of this disclosure includes implementations in which central communication device(s) 101, information processing unit(s) 102, communication device(s) 104, and/or external resources 121 may be operatively linked via some other communication media.

As depicted in FIG. 1, base station 103 may include one or more information processing units 102a, electronic storage 122a, one or more processors 124a, machine-readable code instructions 106a, and/or other components. Information processing units 102a may be the same as or similar to information processing units 102, though embedded and/or integrated within base station 103. In other words, information processing units 102a may perform similar features as information processing units 102. Electronic storage 122a may be the same as or similar to electronic storage 122, though embedded and/or integrated within base station 103. In other words, electronic storage 122a may perform similar features as electronic storage 122. Processors 124a may be the same as or similar to processors 124, though embedded and/or integrated within base station 103. In other words, processors 124a may perform similar features as processors 124. Machine-readable code instructions 106a may be the same as or similar to machine-readable code instructions 106, though embedded and/or integrated within base station 103. In other words, machine-readable code instructions 106a may perform similar features as machine-readable code instructions 106. In some implementations, base station 103 may use multiple different communication links (e.g., using different communication standards and/or formats). In some implementations, communication (in particular registration and configuration) may include communication based on a short-range wireless communication protocol, contact-less information, and/or near-field communication (NFC).

Figure 2:
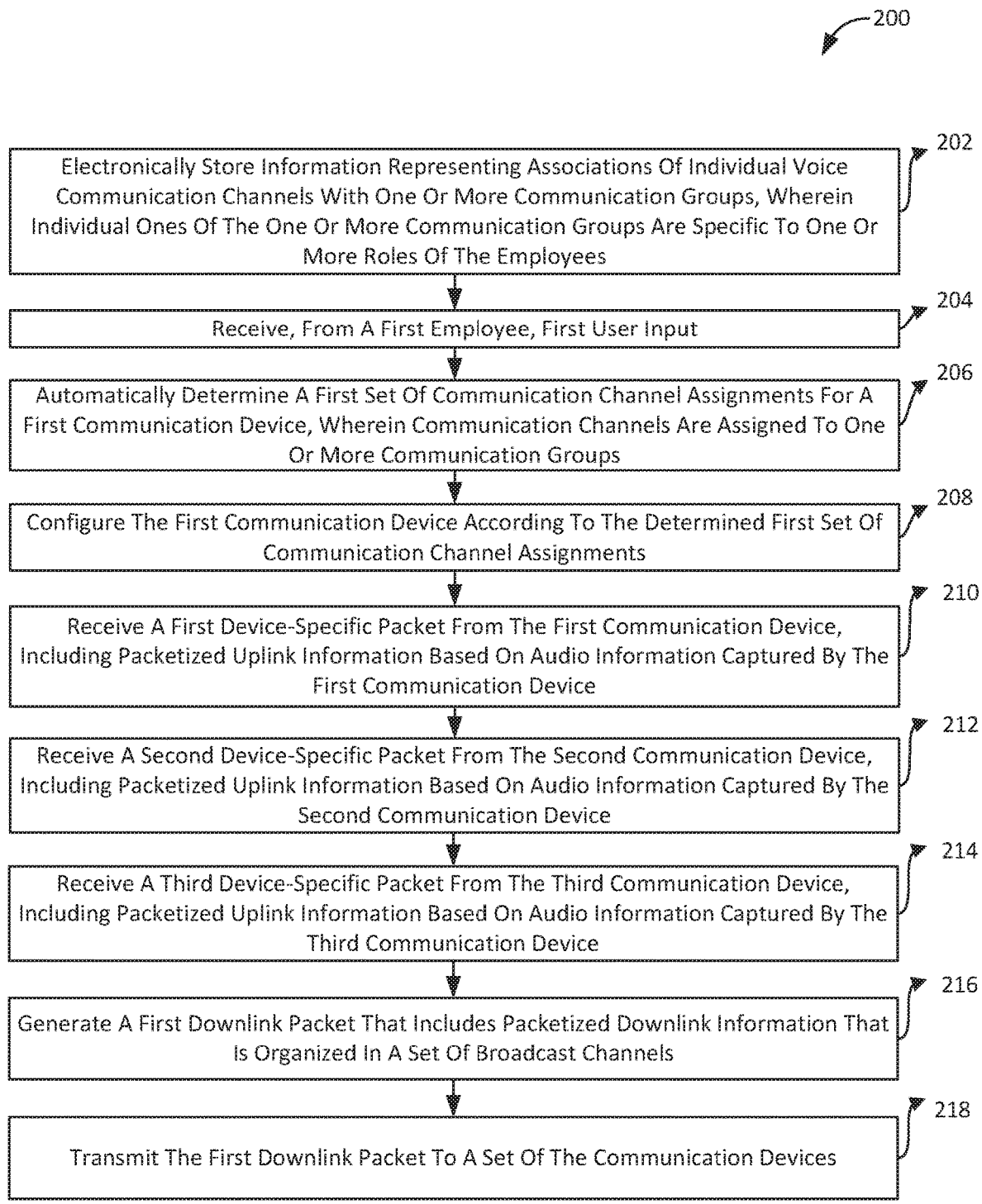
FIG. 2 illustrates a method for assigning and using voice communication channels used by a crew of employees, in accordance with one or more implementations.

FIG. 2 illustrates a method 200 for assigning voice communication channels used by a group of people, e.g., by crew of employees in a quick-service restaurant, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored. The information represents associations of individual voice communication channels with one or more communication groups. Individual ones of the one or more communication groups are associated with one or more roles of the employees. Individual associations are between an individual voice communication channel and a subset of the one or more communication groups. The one or more communication groups include a first communication group, a second communication group, and a third communication group. In some embodiments, operation 202 is performed by electronic storage the same as or similar to electronic storage 122 (shown in FIG. 1 and described herein).

At an operation 204, first user input is received from a first employee. The first user input identifies one or more of the first employee, a first role of the first employee, and/or a first given communication group associated with the first employee. User input and/or action may also be used to identify the specific communication device. The first employee is associated with the first communication device. In some embodiments, operation 204 is performed by an input component the same as or similar to input component 116 (shown in FIG. 1 and described herein).

At an operation 206, a first set of communication channel assignments is automatically determined for the first communication device. A first communication channel is assigned to the first given communication group. A second communication channel is assigned to a first subset of the one or more communication groups. The first subset includes the first given communication group and at least one other communication group. A third communication channel is assigned to a second subset of the one or more communication groups. The second subset includes the first given communication group and at least one additional communication group such that the second subset is different from the first subset. In some embodiments, operation 206 is performed by an assignment component the same as or similar to assignment component 118 (shown in FIG. 1 and described herein).

At an operation 208, the first communication device is configured according to the determined first set of communication channel assignments. In some embodiments, operation 208 is performed by a configuration component the same as or similar to configuration component 120 (shown in FIG. 1 and described herein).

At an operation 210, a first device-specific packet is received from a first communication device associated with the first employee. The first device-specific packet includes packetized uplink information based on audio information captured by the first communication device. The first device-specific packet is targeted to the first communication group. In some embodiments, operation 210 is performed by a packet receiving component the same as or similar to packet receiving component 112 (shown in FIG. 1 and described herein).

At an operation 212, a second device-specific packet is received from the second communication device associated with the second employee. The second device-specific packet includes packetized uplink information based on audio information captured by the second communication device. The second device-specific packet is targeted to the second communication group. In some embodiments, operation 212 is performed by a packet receiving component the same as or similar to packet receiving component 112 (shown in FIG. 1 and described herein).

At an operation 214, a third device-specific packet is received from the third communication device associated with the third employee. The third device-specific packet includes packetized uplink information based on audio information captured by the third communication device. The third device-specific packet is targeted to the third communication group. In some embodiments, operation 214 is performed by a packet receiving component the same as or similar to packet receiving component 112 (shown in FIG. 1 and described herein).

At an operation 216, a first downlink packet is generated that includes packetized downlink information that is organized in a set of broadcast channels. Individual broadcast channels are used for audio information received in device-specific packets that were targeted to individual subsets of the one or more communication groups. In some embodiments, operation 216 is performed by a packet generating component the same as or similar to packet generating component 108 (shown in FIG. 1 and described herein).

At an operation 218, the first downlink packet is transmitted to a set of the communication devices, including the first communication device. The first communication device receives user input from the first employee that selects a given communication channel. The given communication channel is one of the first communication channel, the second communication channel, or the third communication channel. The first communication device presents audio information received in any of the individual broadcast channels that were targeted to any of the individual subsets of the one or more communication groups that include the given communication channel as selected. In some embodiments, operation 218 is performed by a packet transmission component the same as or similar to packet transmission component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A communication system configured for assigning particular voice communication channels used by communication devices in a drive-through restaurant, wherein the communication devices include a first communication device, the system comprising:

electronic storage configured to electronically store information, wherein the information represents associations of individual voice communication channels with communication groups, wherein individual ones of the communication groups are specific to one or more roles and/or responsibilities in the drive-through restaurant, wherein individual associations are between the individual voice communication channels and subsets of the communication groups, wherein the communication groups include a first communication group and a second communication group; and one or more hardware processors configured by machine-readable instructions to:
receive, from a first person, first user input that identifies one or more of the first person, a first role of the first person, and/or the first communication group;
automatically configure the first communication device according to a first set of communication channel assignments, wherein a first communication channel is assigned to a first subset of the communication groups, wherein the first subset includes the first communication group and at least one other communication group, wherein a second communication channel is assigned to a second subset of the communication groups, and wherein the second subset is different from the first subset;
receive a first device-specific packet from the first communication device, wherein the first device-specific packet includes packetized uplink information based on audio information captured by the first communication device, wherein the first device-specific packet is targeted to the first communication group;
generate a first downlink packet that includes packetized downlink information based on audio information previously received in device-specific packets that were targeted to individual ones of the subsets of the communication groups;
receive, by the first communication device, user input that selects a given communication channel, wherein the given communication channel is one of the first communication channel or the second communication channel; and transmit the first downlink packet to a set of the communication devices, including the first communication device, for presenting audio information associated with individual ones of the subsets of the communication groups that include the given communication channel as selected.

2. The communication system of claim 1, wherein the first communication device includes at least one of a headset and/or a belt pack.

3. The communication system of claim 1, wherein a third communication channel is assigned to a third communication group.

4. The communication system of claim 3, wherein the first communication group is specific to a first type of roles of in the drive-through restaurant, wherein the second communication group is specific to a second type of roles of people working in the drive-through restaurant, and wherein the third communication group is specific to order-taking in the drive-through restaurant.

5. The communication system of claim 1, wherein one or more hardware processors configured by machine-readable instructions to:

configure the first communication device according to the determined first set of communication channel assignments.

6. The communication system of claim 5, wherein configuring the first communication device includes transmitting configuration information to the first communication device via a wireless communication link that is separate and different from any communication links used to exchange at least one of the first device-specific packet, the second device-specific packet, or the first downlink packet.

7. The communication system of claim 1, wherein the first downlink packet further includes packetized downlink information that is organized in a set of dedicated channels, wherein the set of dedicated channels includes a first dedicated channel that is used for audio information received in device-specific packets that were targeted, at least, to the first communication group, minus audio information received from the first communication device, such that the first person will not receive an echo through the first dedicated channel.

8. The communication system of claim 4, wherein the one or more hardware processors are further configured to:

receive a third device-specific packet from a third communication device, wherein the third device-specific packet includes packetized uplink information based on audio captured by the third communication device, wherein the third device-specific packet is targeted to the third communication group;

transmit the packetized uplink information included in the third device-specific packet to an order-taking system controlled by voice commands.

9. The communication system of claim 1, wherein the first downlink packet is transmitted within a given timeframe having a duration between 10 and 20 ms.

10. The communication system of claim 1, wherein the packetized downlink information included in the first downlink packet is organized in a set of broadcast channels, wherein individual broadcast channels are used for the audio previously received in the device-specific packets that were targeted to the individual ones of the subsets of the communication groups.

11. A method for assigning particular voice communication channels used by communication devices in a drive-through restaurant, wherein the communication devices include a first communication device, the method comprising:

electronically storing information, wherein the information represents associations of individual voice communication channels with communication groups, wherein individual ones of the communication groups are specific to one or more roles and/or responsibilities in the drive-through restaurant, wherein individual associations are between the individual voice communication channels and subsets of the communication groups, wherein the communication groups include a first communication group and a second communication group;

receiving, from a first person, first user input that identifies one or more of the first person, a first role of the first person, and/or the first communication group;

automatically configuring the first communication device according to a first set of communication channel assignments, wherein a first communication channel is assigned to a first subset of the communication groups, wherein the first subset includes the first communication group and at least one other communication group, wherein a second communication channel is assigned to a second subset of the communication groups, and wherein the second subset is different from the first subset;

receiving a first device-specific packet from the first communication device, wherein the first device-specific packet includes packetized uplink information based on audio information captured by the first communication device, wherein the first device-specific packet is targeted to the first communication group;

generating a first downlink packet that includes packetized downlink information based on audio information previously received in device-specific packets that were targeted to individual ones of the subsets of the communication groups;

receiving, by the first communication device, user input that selects a given communication channel, wherein the given communication channel is one of the first communication channel or the second communication channel; and transmitting the first downlink packet to a set of the communication devices, including the first communication device, for presenting audio information associated with individual ones of the subsets of the communication groups that include the given communication channel as selected.

12. The method of claim 11, wherein the first communication device includes at least one of a headset and/or a belt pack.

13. The method of claim 11, wherein a third communication channel is assigned to a third communication group.

14. The method of claim 13, wherein the first communication group is specific to a first type of roles in the drive-through restaurant, wherein the second communication group is specific to a second type of roles in the drive-through restaurant, and wherein the third communication group is specific to order-taking in the drive-through restaurant.

15. The method of claim 11, further comprising:

configuring the first communication device according to the determined first set of communication channel assignments.

16. The method of claim 15, wherein configuring the first communication device includes transmitting configuration information to the first communication device via a wireless communication link that is separate and different from any communication links used to exchange at least one of the first device-specific packet, the second device-specific packet, or the first downlink packet.

17. The method of claim 11, wherein the first downlink packet further includes packetized downlink information that is organized in a set of dedicated channels, wherein the set of dedicated channels includes a first dedicated channel that is used for audio information received in device-specific packets that were targeted, at least, to the first communication group, minus audio information received from the first communication device, such that the first person will not receive an echo through the first dedicated channel.

18. The method of claim 14, further comprising:
receiving a third device-specific packet from a third communication device, wherein the third device-specific packet includes packetized uplink information based on audio captured by the third communication device, wherein the third device-specific packet is targeted to the third communication group;
transmitting the packetized uplink information included in the third device-specific packet to an order-taking system controlled by voice commands.

19. The method of claim 11, wherein the first downlink packet is transmitted within a given timeframe having a duration between 10 and 20 ms.

20. The method of claim 11, wherein the packetized downlink information included in the first downlink packet is organized in a set of broadcast channels, wherein individual broadcast channels are used for the audio previously received in the device-specific packets that were targeted to the individual ones of the subsets of the communication groups.

21. A communication system configured for assigning particular voice communication channels used by communication devices, wherein the communication devices include a first communication device, the system comprising:
electronic storage configured to electronically store information, wherein the information represents associations of individual voice communication channels with communication groups, wherein individual ones of the communication groups are specific to one or more roles and/or responsibilities in a professional environment, wherein individual associations are between the individual voice communication channels and subsets of the communication groups, wherein the communication groups include a first communication group and a second communication group; and
one or more hardware processors configured by machine-readable instructions to:
receive, from a first person, first user input that identifies one or more of the first person, a first role of the first person, and/or the first communication group;
automatically configure the first communication device according to a first set of communication channel assignments, wherein a first communication channel is assigned to a first subset of the communication groups, wherein the first subset includes the first communication group and at least one other communication group, wherein a second communication channel is assigned to a second subset of the communication groups, and wherein the second subset is different from the first subset;
receive a first device-specific packet from the first communication device, wherein the first device-specific packet includes packetized uplink information based on audio information captured by the first communication device, wherein the first device-specific packet is targeted to the first communication group;
generate a first downlink packet that includes packetized downlink information based on audio information previously received in device-specific packets that were targeted to individual ones of the subsets of the communication groups, wherein at least part of the packetized downlink information is organized in a set of broadcast channels, wherein individual broadcast channels are used for the audio previously received in the device-specific packets that were targeted to the individual ones of the subsets of the communication groups;
receive, by the first communication device, user input that selects a given communication channel, wherein the given communication channel is one of the first communication channel or the second communication channel; and
transmit the first downlink packet to a set of the communication devices, including the first communication device, for presenting audio information associated with individual ones of the subsets of the communication groups that include the given communication channel as selected.

22. A method for assigning particular voice communication channels used by communication devices, wherein the communication devices include a first communication device, the method comprising:
electronically storing information, wherein the information represents associations of individual voice communication channels with communication groups, wherein individual ones of the communication groups are specific to one or more roles and/or responsibilities in a professional environment, wherein individual associations are between the individual voice communication channels and subsets of the communication groups, wherein the communication groups include a first communication group and a second communication group;
receiving, from a first person, first user input that identifies one or more of the first person, a first role of the first person, and/or the first communication group;
automatically configuring the first communication device according to a first set of communication channel assignments, wherein a first communication channel is assigned to a first subset of the communication groups, wherein the first subset includes the first communication group and at least one other communication group, wherein a second communication channel is assigned to a second subset of the communication groups, and wherein the second subset is different from the first subset;
receiving a first device-specific packet from the first communication device, wherein the first device-specific packet includes packetized uplink information based on audio information captured by the first communication device, wherein the first device-specific packet is targeted to the first communication group;
generating a first downlink packet that includes packetized downlink information based on audio information previously received in device-specific packets that were targeted to individual ones of the subsets of the communication groups, wherein at least part of the packetized downlink information is organized in a set of broadcast channels, wherein individual broadcast channels are used for the audio previously received in the device-specific packets that were targeted to the individual ones of the subsets of the communication groups;

receiving, by the first communication device, user input that selects a given communication channel, wherein the given communication channel is one of the first communication channel or the second communication channel; and transmitting the first downlink packet to a set of the communication devices, including the first communication device, for presenting audio information associated with individual ones of the subsets of the communication groups that include the given communication channel as selected.

\* \* \* \* \*